(12) United States Patent
Takahashi

(10) Patent No.: US 6,175,174 B1
(45) Date of Patent: *Jan. 16, 2001

(54) AXIAL LOAD CARRYING MAGNETIC BEARING FOR A ROTATABLE BODY

(75) Inventor: Masahiro Takahashi, Kanagawa (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/992,005

(22) Filed: Dec. 17, 1997

(30) Foreign Application Priority Data

Dec. 25, 1996 (JP) .................................................. 8-346339

(51) Int. Cl.$^7$ ............................................ H02K 7/08
(52) U.S. Cl. ................... 310/90.5; 310/67 R; 310/68 R; 310/90
(58) Field of Search ................................ 310/67 R, 68 R, 310/90.5, 90; 384/100, 107, 120, 123; 350/6.8

(56) References Cited

U.S. PATENT DOCUMENTS

| | | | |
|---|---|---|---|
| 4,357,555 | * 11/1982 | Gerkema et al. | 378/135 |
| 4,523,800 | * 6/1985 | Yamashita et al. | 350/6.7 |
| 4,717,223 | * 1/1988 | Ishida et al. | 350/6.8 |
| 4,726,640 | * 2/1988 | Iwama et al. | 350/6.8 |
| 4,958,098 | * 9/1990 | Sarraf | 310/156 |
| 5,280,208 | * 1/1994 | Komura et al. | 310/90 |
| 5,289,067 | * 2/1994 | Tanaka et al. | 310/90.5 |
| 5,453,650 | * 9/1995 | Hashimoto et al. | 310/268 |
| 5,675,201 | * 10/1997 | Komura et al. | 310/90.5 |
| 5,731,831 | * 3/1998 | Murabe et al. | 347/259 |

FOREIGN PATENT DOCUMENTS

| | | | |
|---|---|---|---|
| 60-55316 | 3/1985 | (JP) | 310/905 |
| 60-244913 | 12/1985 | (JP) | 310/905 |
| 62-85216 | 4/1987 | (JP) | 310/905 |

* cited by examiner

*Primary Examiner*—Elvin Enad
(74) *Attorney, Agent, or Firm*—Finnegan, Henderson, Farabow, Garrett & Dunner, L.L.P.

(57) ABSTRACT

The present invention has achieved an object of obtaining a magnetic bearing in which a drive motor can be made compact and the number of components can be reduced. The present invention is formed by a magnetic bearing used by a drive motor which includes: (a) a stationary shaft which is fixed to a base; (b) a rotating body which is rotatably provided at the outer peripheral portion of the stationary shaft with a predetermined gap therebetween; (c) a rotational permanent magnet which is fixed to the outer peripheral portion of the rotating body; and (d) a drive coil which is disposed on a circuit board of the base and which generates torque between the drive coil and the rotational permanent magnet; the magnetic bearing, comprising: a levitational permanent magnet which is disposed at the axial direction end portion of the rotating body in an annular shape; and a yoke which forms a magnetic circuit between the yoke and the rotational permanent magnet and which faces the outer peripheral portion of the levitational permanent magnet with a predetermined gap therebetween.

6 Claims, 8 Drawing Sheets

AXIAL LOAD CARRYING MAGNETIC BEARING FOR A ROTATABLE BODY

BACKGROUND OF THE INVENTION

1. Field of the Invention

The present invention relates to a magnetic bearing, and more particularly, to a magnetic bearing of a drive motor which drives an optical deflector used in an electrophotographic device such as a laser printer, digital copying machine, and the like.

2. Description of the Related Art

Normally, an image forming device includes an optical deflector 60 shown in FIG. 10 as means for scanning an optical beam such as a laser and the like. The optical deflector 60 is formed by a rotary polygon mirror 12, in which a plurality of reflecting mirrors are formed at the outer periphery, and a dynamic pressure air bearing type drive motor 62 which rotates rapidly the rotary polygon mirror 12 (see Japanese Patent Application Laid-Open (JP-A) No. 60-55316, Japanese Patent Application Laid-Open (JP-A) No. 60-244913, and Japanese Patent Application Laid-Open (JP-A) No. 62-85216).

The drive motor 62 includes a stationary shaft 66, at which grooves 64 for generating dynamic pressure are provided, and a sleeve 68, which is rotatably provided at the outer peripheral surface of the stationary shaft 66 with a predetermined gap therebetween. The drive motor 62 has a so-called radial dynamic pressure air bearing mechanism, i.e., the sleeve 68 rotates without abutting the stationary shaft 66 due to the dynamic pressure effect generated at the time of rotation.

Further, the supporting structure of the sleeve 68 in the axial direction thereof is the one in which the sleeve 68 is levitated by magnetic attracting force generated between a ring-shaped permanent magnet 72 for lift (hereinafter, "levitational permanent magnet") and a stationary permanent magnet 74. The levitational permanent magnet 72 is mounted to a pedestal 70, on which the rotary polygon mirror 12 is disposed, outwardly in the radial direction thereof, and the stationary permanent magnet 74 is disposed at the outer peripheral portion of the levitational permanent magnet 72.

On the other hand, a magnetic circuit which is required for the rotation of the sleeve 68 is formed between a yoke 78 and a permanent magnet 76 for rotation (hereinafter, "rotational permanent magnet") which is fixed to the outer peripheral portion of the pedestal 70. Moreover, as a plurality of magnetic poles of the rotational permanent magnet 76 are detected by a magnetic detection element 80 and a drive coil 84 provided on a circuit board 82 is energized at a predetermined timing logic, the torque of the sleeve 68 is obtained.

However, in the drive motor 62, because the levitational permanent magnet 72 and the stationary permanent magnet 74 are provided outwardly in the radial direction of the sleeve 68, a housing that accommodates the components projects outwardly. As a result, the drive motor 62 becomes large.

Further, because the magnetic circuit for rotational drive and the magnetic circuit for magnetic bearing are formed separately, the number of components cannot be reduced. Furthermore, since the borderline region of the magnetic poles of the stationary permanent magnet 74 at a fixed side and that of the levitational permanent magnet 72 at a rotational side face to each other, when one of the permanent magnets is formed thinner than the other, a portion in which magnetic force is small is generated and the magnetic attracting force may be thereby decreased.

SUMMARY OF THE INVENTION

With the aforementioned in view, an object of the present invention is to provide a magnetic bearing in which a drive motor can be made compact and the number of components can be reduced.

In a primary aspect of the present invention, a rotating body is provided around a stationary shaft so as to be rotatable. Further, a rotational permanent magnet is fixed to the outer peripheral portion of the rotating body, and torque is generated by energizing a drive coil disposed at a base at a predetermined timing logic. In this way, the rotating body rotates with the rotational permanent magnet.

On the other hand, a levitational permanent magnet is disposed at the axial direction end portion of the rotating body in an annular shape. A yoke serving as a magnetic body is disposed so as to face the outer peripheral portion of the levitational permanent magnet with a predetermined gap therebetween. The rotating body is supported in a levitated state due to the magnetic attracting force generated between the yoke and the levitational permanent magnet.

Namely, compared to a structure in which a levitational permanent magnet is fixed to the outer peripheral portion of a rotating body, the magnetic bearing can be designed more compact as the levitational permanent magnet is placed nearer to the central portion of the rotating body. Thus, the drive motor can be made compact.

Further, because the yoke, which originally forms a magnetic circuit between the yoke and the rotational permanent magnet, is used as a magnetic body which generates magnetic attracting force between the yoke and the levitational permanent magnet, the number of components for the drive motor can be decreased.

In the above structure, the inner peripheral surface or the outer peripheral surface of the levitational permanent magnet is polarized to a single pole, and the plate thickness of the yoke is thinner than the plate thickness of the levitational permanent magnet.

Namely, because the borderline region of the magnetic poles of the levitational permanent magnet runs along the axial direction of the rotating body and does not face the yoke, there is no such portion exist in which magnetic force is small with respect to the yoke, the magnetic force is concentrated on the yoke having thin plate thickness, and strong magnetic attracting force can be thus obtained.

Further in another structure slightly different from the above, the upper surface or the lower surface of the levitational permanent magnet is polarized to a single pole, and the plate thickness of the yoke is equal to or thicker than the plate thickness of the levitational permanent magnet.

Namely, as the yoke having a thick plate thickness faces the borderline region of the magnetic poles of the levitational permanent magnet and the curvature of the leakage flux with respect to the magnetic body is increased, strong magnetic force can be obtained.

In a secondary aspect of the present invention, a rotating body is rotatably provided around a stationary shaft fixed to a base and a levitational permanent magnet is disposed at the axial direction end portion of the rotating body in an annular shape. The levitational permanent magnet faces a magnetic body disposed at the base side with a predetermined gap therebetween, and the rotating body is levitated due to the magnetic attracting force generated between the magnetic body and the levitational permanent magnet.

Namely, compared to a structure in which a levitational permanent magnet is fixed to the outer peripheral portion of a rotating body, the magnetic body can be placed nearer to the rotating body as the levitational permanent magnet is placed nearer to the central portion of the rotating body. As a result, the magnetic bearing can be designed compact.

DESCRIPTION OF THE PREFERRED EMBODIMENTS

Figure 1:
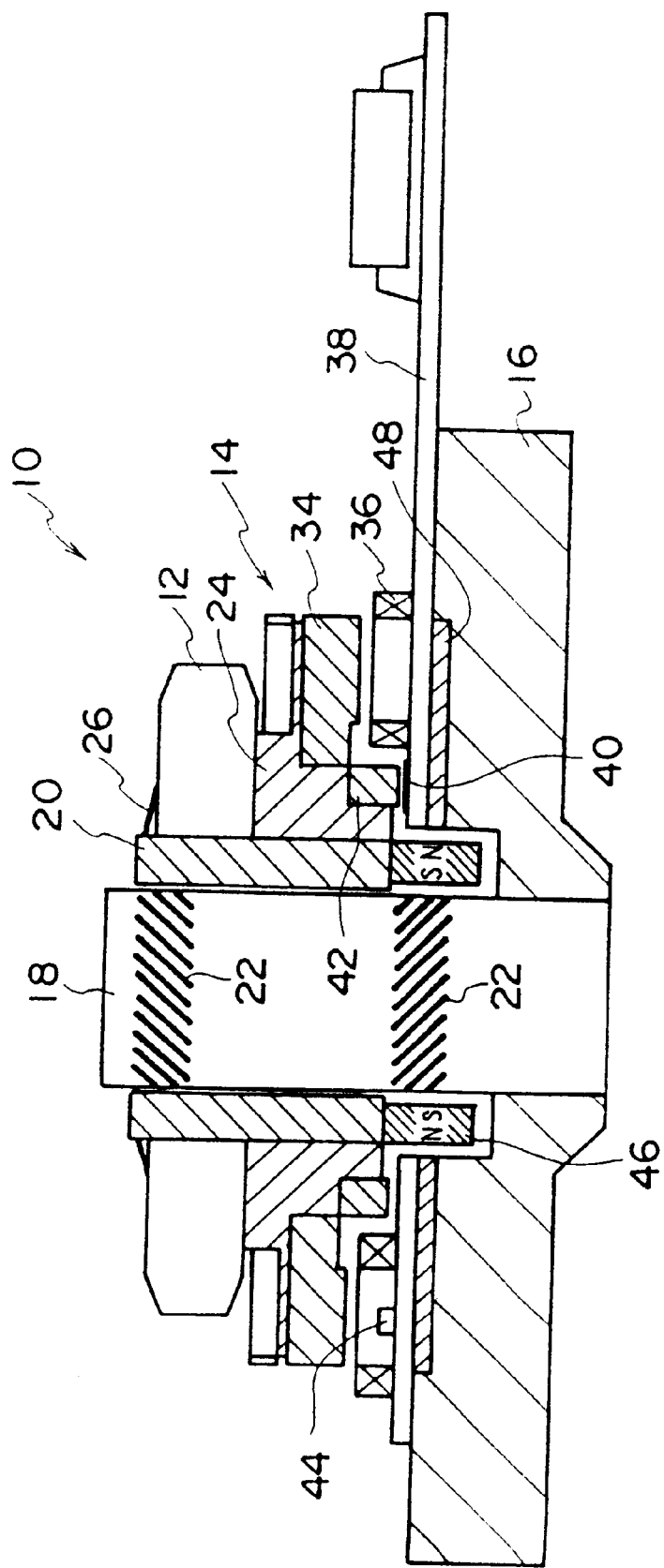
FIG. 1 is a cross-sectional view which shows an optical deflector relating to a first embodiment.

An optical deflector 10 shown in FIG. 1 will be explained as a first embodiment using a magnetic bearing of the present invention.

The optical deflector 10 is formed by a rotary polygon mirror 12, in which a plurality of reflecting mirrors are formed at the outer periphery, and a dynamic pressure air bearing type drive motor 14, which rapidly rotates the rotary polygon mirror 12.

The drive motor 14 includes a stationary shaft 18 which stands upright at a base 16. A sleeve 20 is rotatably provided at the outer side of the stationary shaft 18 with a predetermined gap therebetween. The stationary shaft 18 is formed of a non-magnetic material, and Herringbone grooves 22 for generating dynamic pressure are provided at the outer peripheral surface of the stationary shaft 18.

When the sleeve 20 rotates due to the function of the Herringbone grooves 22, air flows into the gap between the stationary shaft 18 and the sleeve 20 and air pressure is generated in a radial direction (the radial direction of the stationary shaft 18). Due to the air dynamic pressure operation, the sleeve 20 rotates without abutting the stationary shaft 18.

Figure 9:
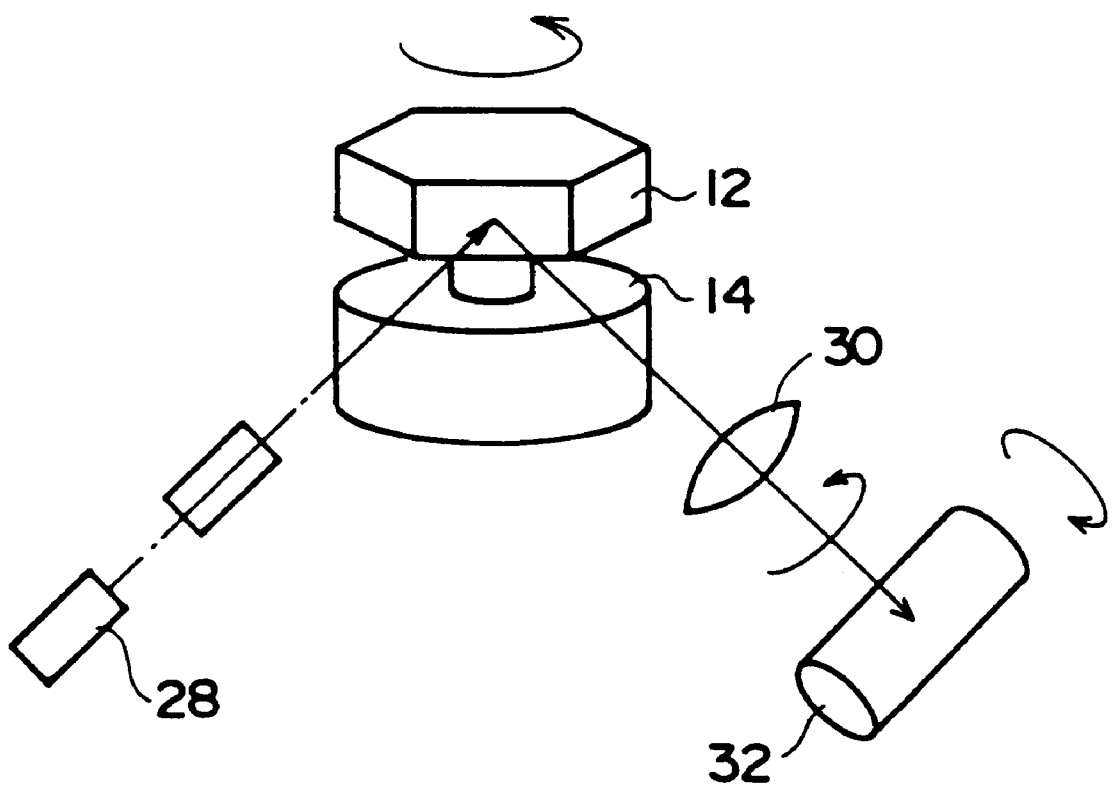
FIG. 9 is a schematic structural view which shows image recording carried out by an optical deflector in an image forming device.

Further, a pedestal 24 is fixed to the outer peripheral portion of the sleeve 20. The rotary polygon mirror 12, which is fitted coaxially with the sleeve 20, is attached onto the pedestal 24 and fixed by a spring 26. As a result, the rotary polygon mirror 12 rotates rapidly with the sleeve 20. As shown in FIG. 9, optical beam irradiated from a laser 28 is deflected by the rotary polygon mirror 12 and then passed through a convergent optical system 30. Thereafter, a photosensitive drum 32 is scanned by the optical beam in a main direction.

Moreover, a ring-shaped rotational permanent magnet 34 is attached to the outer peripheral portion of the pedestal 24. Beneath the rotational permanent magnet 34, a drive coil 36, in which an electromagnetic coil is wound around an annular iron core, is disposed on a resinous circuit board 38.

Figure 8:
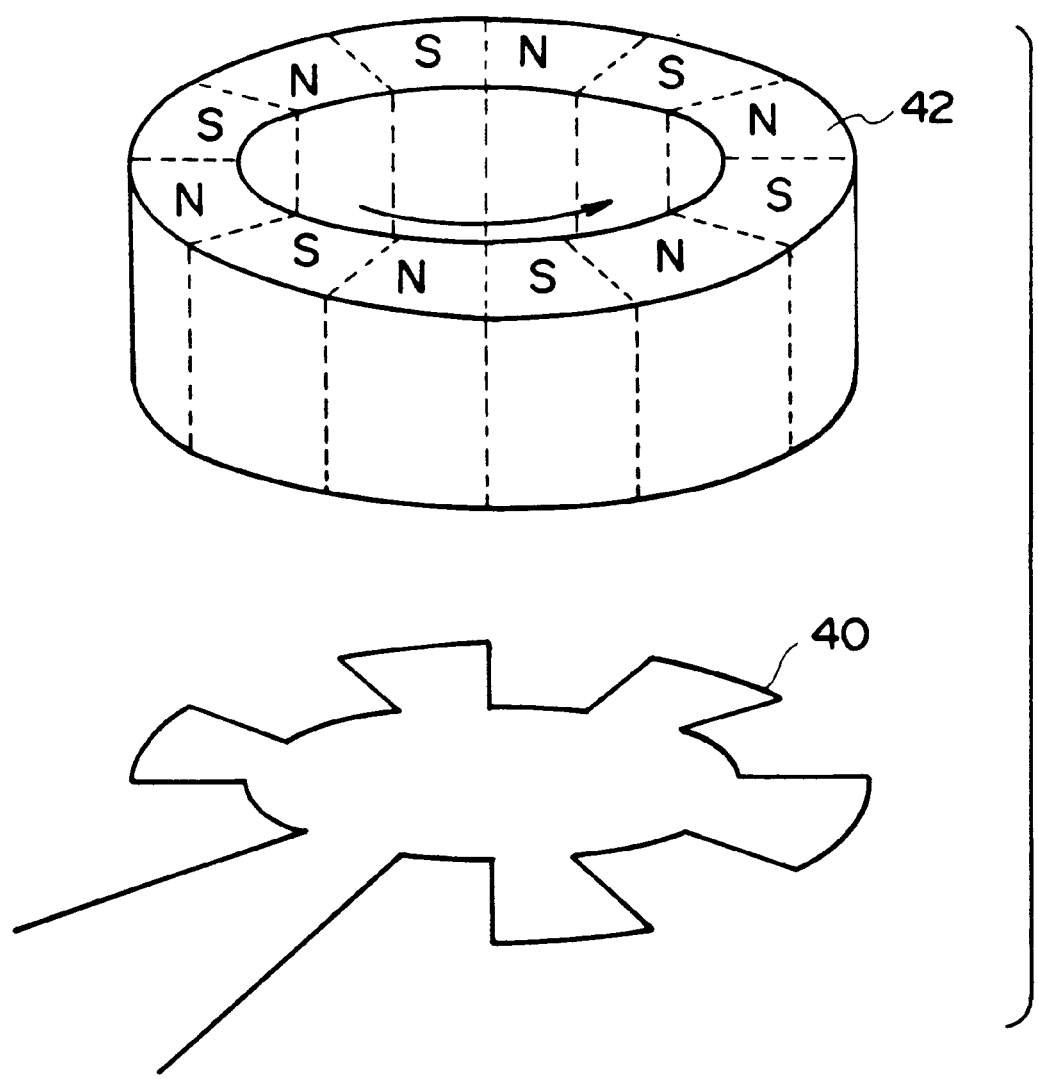
FIG. 8 is a schematic structural view of rotational signal detection means.

A search coil 40 for detecting rotation shown in FIG. 8 is formed on the circuit board 38. A ring-shaped permanent magnet 42 for detecting the number of revolutions (hereinafter, "revolution number detection permanent magnet"), which is fixed to the lower end portion of the pedestal 24, is disposed above the search coil 40. Further, a magnetic pole detection element 44 for detecting the magnetic pole of the rotational permanent magnet 34 is provided on the circuit board 38.

Figure 2:
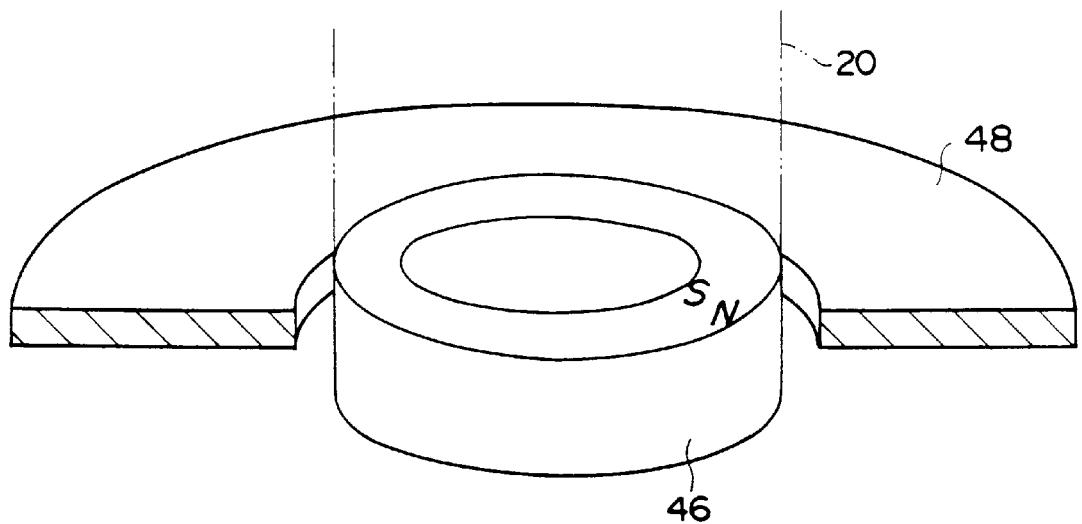
FIG. 2 is a partially perspective view which shows a relationship between a levitational permanent magnet and a yoke in the optical deflector relating to the first embodiment.

On the other hand, as shown in FIG. 2, a ring-shaped levitational permanent magnet 46 whose outer peripheral surface is polarized to an N-pole and whose inner peripheral surface is polarized to an S-pole is fixed to the lower end portion of the sleeve 20. A ring-shaped yoke 48 surrounds the outer peripheral surface of the levitational permanent magnet 46 with a predetermined gap therebetween. The yoke 48 is formed of an iron plate and the thickness thereof is thinner than the plate thickness (the thickness in the axial direction of the sleeve 20) of the levitational permanent magnet 46. The yoke 48 is disposed between the base 16 and the circuit board 38, and a magnetic circuit is formed between the yoke 48 and the rotational permanent magnet 34.

Next, the operation of the optical deflector 10 in the first embodiment will be explained.

A plurality of magnetic poles of the rotational permanent magnet 34 are detected by the magnetic detection element 44. As the drive coil 36 provided on the circuit board 38 is energized at predetermined timing logic, the sleeve 20 rotates with the rotational permanent magnet 34. When the sleeve 20 rotates, the sleeve 20 does not contact the stationary shaft 18 due to the effect of air dynamic pressure. Thus, the sleeve 20 can rotate rapidly and stably.

Since variant components in the frequency of voltage induced to the search coil 40 by the revolution number detection permanent magnet 42 are used as detection signals, the number of revolutions of the rotary polygon mirror 12 is controlled so as to be constant.

Figure 10:
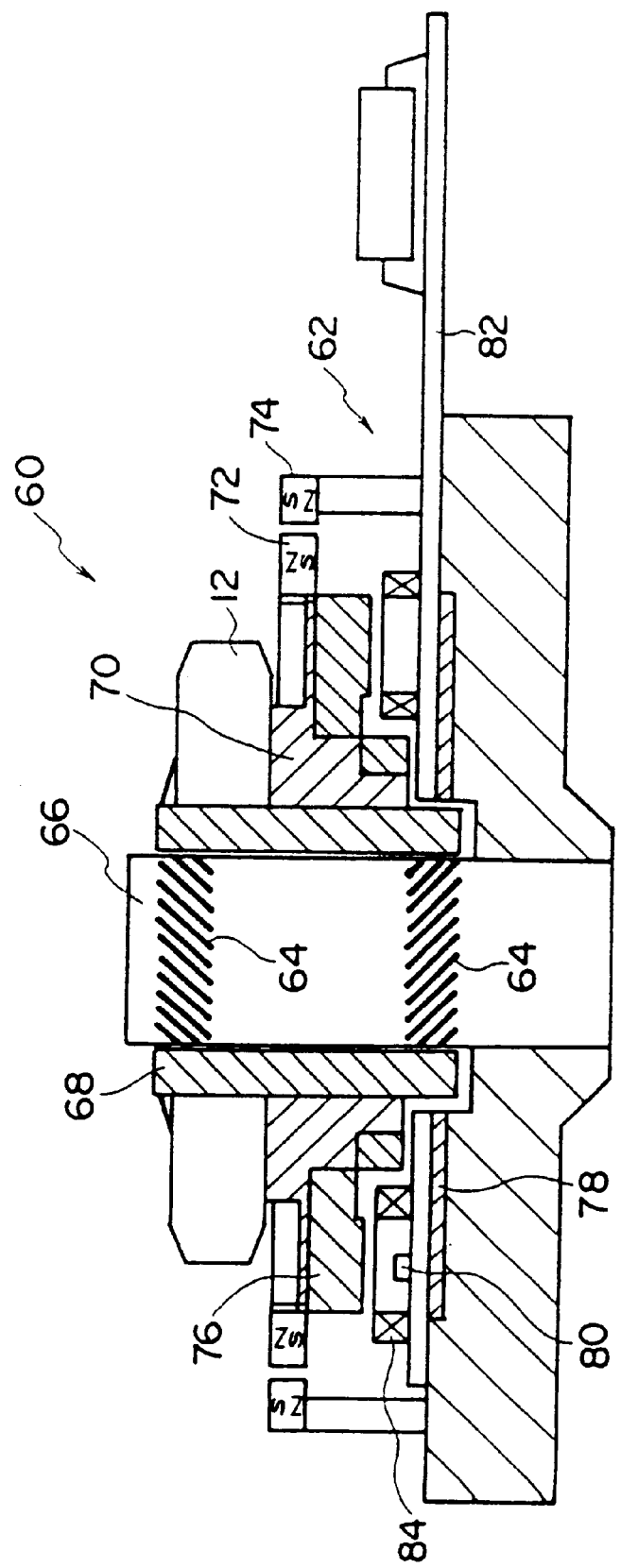
FIG. 10 is a cross-sectional view of a conventional optical deflector.

Further, the sleeve 20 is supported in a levitated state in the axial direction thereof by a horizontal direction magnetic attracting force generated between the levitational permanent magnet 46 and the yoke 48. Namely, the yoke 48 forms a magnetic circuit for rotational drive and a magnetic circuit for magnetic bearing so that the permanent magnet for magnetic bearing which was conventionally required at a fixed side is no longer needed (see FIG. 10). As a result, the drive motor 14 can be made compact.

Figure 3:
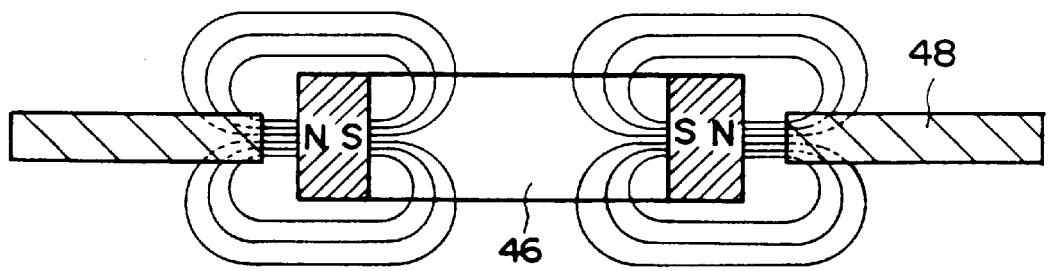
FIG. 3 is a conceptual view which shows the flow of lines of magnetic force between the levitational permanent magnet and the yoke in the optical deflector relating to the first embodiment.

Moreover, because the borderline region of the magnetic poles of the levitational permanent magnet 46 runs along the axial direction of the sleeve 20 and does not face the yoke 48, there is no such portion generated in which magnetic force is small with respect to the yoke 48. Thus, as shown in FIG. 3, magnetic force concentrates and strong magnetic attracting force can be obtained.

The yoke 48 needs a magnetic characteristic in which magnetic flux density which passes through the inner side thereof does not saturate. Further, since the search coil 40 is disposed in the vicinity of the levitational permanent magnet 46, the search coil 40 may influence the voltage induced by the revolution number detection permanent magnet 42. However, because the levitational permanent magnet 46 is polarized to a single pole, even if a zero point position may be deviated to the N-pole or the S-pole, the amplitude of the output voltage is not adversely effected.

Next, an optical deflector 11 relating to a second embodiment will be explained.

Figure 4:
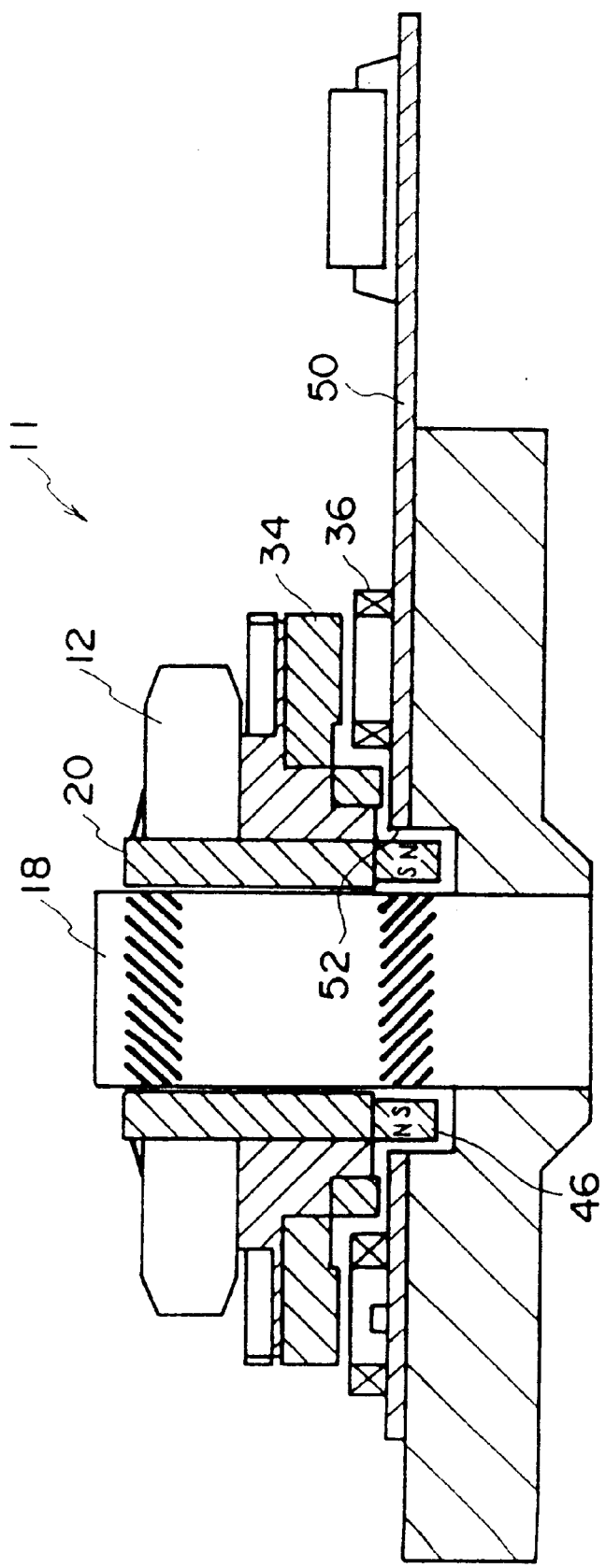
FIG. 4 is a cross-sectional view which shows an optical deflector relating to a second embodiment.

In the second embodiment, as shown in FIG. 4, a drive coil 36 is disposed on an iron substrate 50. An annular hole 52 is formed at the central portion of the iron substrate 50, and the inner peripheral surface of the annular hole 52 opposes the outer peripheral surface of a levitational permanent magnet 46 with a predetermined gap therebetween.

Namely, in the second embodiment, because a magnetic circuit for rotational drive and a magnetic circuit for magnetic bearing are formed on the iron substrate 50, the circuit board 38 in the first embodiment is no longer needed, and additionally, the number of components is reduced.

Next, an optical deflector 13 relating to a third embodiment will be explained.

Figure 5:
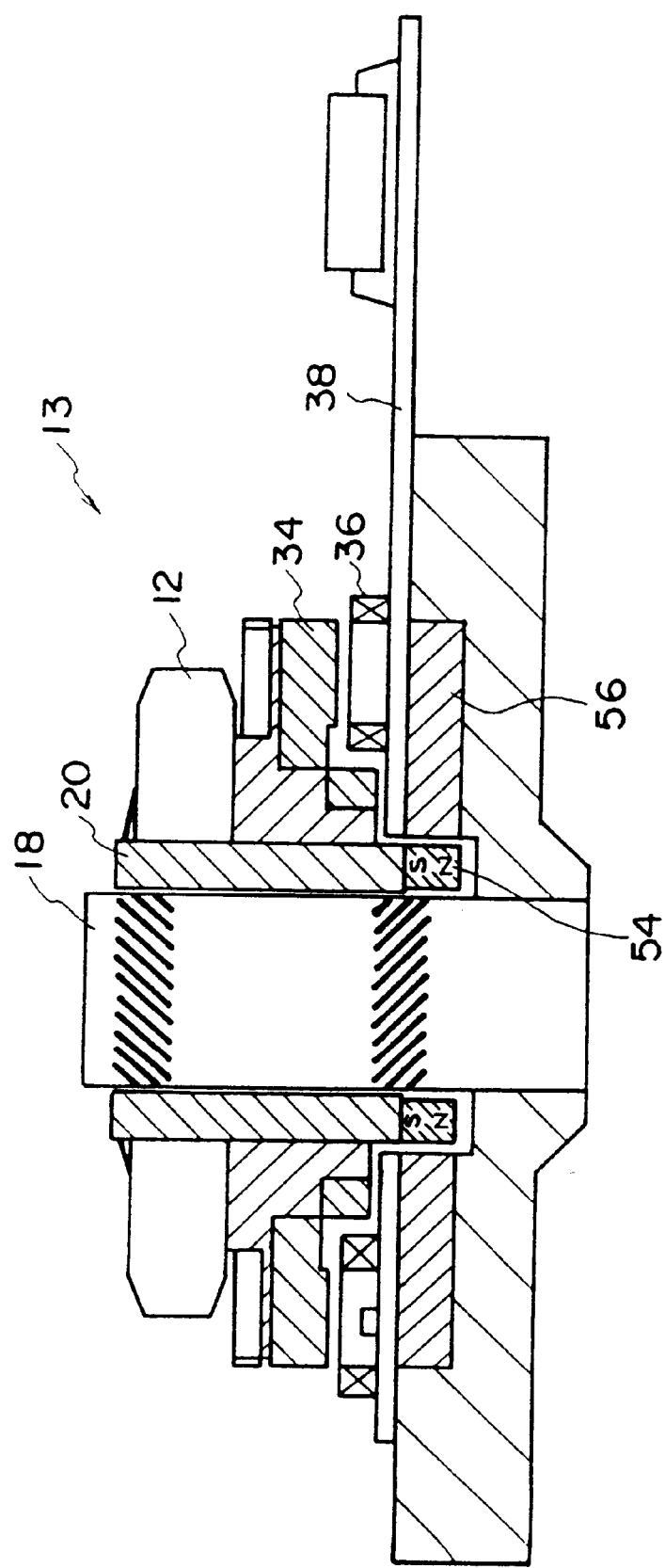
FIG. 5 is a cross-sectional view which shows an optical deflector relating to a third embodiment.
Figure 6:
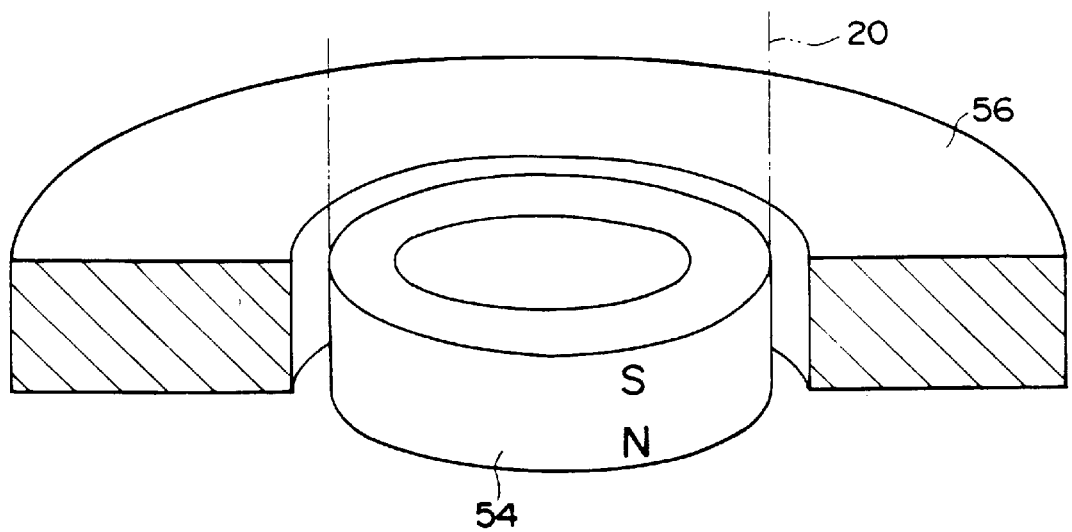
FIG. 6 is a partially perspective view which shows a relationship between a levitational permanent magnet and a yoke in the optical deflector relating to the third embodiment.

In the third embodiment, as shown in FIGS. 5 and 6, the upper surface of a ring-shaped levitational permanent magnet 54 is polarized to an N-pole and the lower surface thereof is polarized to an S-pole. The plate thickness of a ring-shaped yoke 56 is equal to or larger than the plate thickness of the levitational permanent magnet 54.

Figure 7:
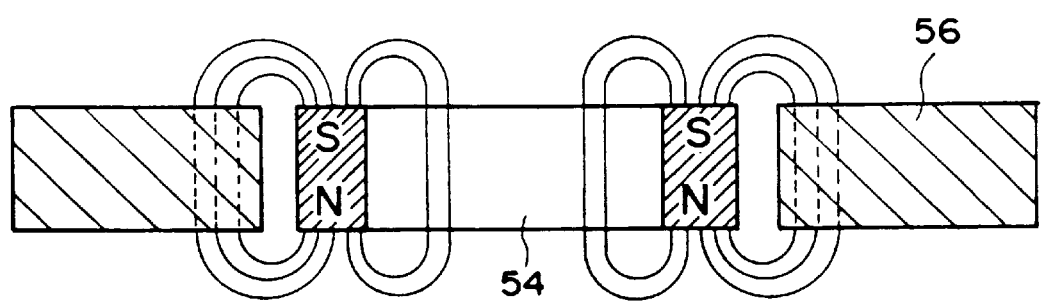
FIG. 7 is a conceptual view which shows the flow of lines of magnetic force between the levitational permanent magnet and the yoke in the optical deflector relating to the third embodiment.

In this way, as shown in FIG. 7, the borderline region of the magnetic poles of the levitational permanent magnet 54 faces the yoke 56 and the plate thickness of the yoke 56 has been increased. Consequently, the curvature of leakage flux with respect to the yoke 56 is increased and strong magnetic force can be obtained.

In the above embodiments, a description is given of a case in which a magnetic bearing is used for a drive motor which rapidly rotates a rotary polygon mirror. However, it goes without saying that the magnetic bearing is also applicable to a mechanism other than the one which rotates a rotary polygon mirror.

Furthermore, the magnetic bearing of the present invention is described of an example in which the dynamic pressure air bearing type drive motor is used. However, the magnetic bearing in a thrust direction may be replaced by a ball bearing. Also, the magnetic bearing may form a structure in which a sleeve is stationary and a stationary shaft is rotated.

As the present invention is structured as described above, the drive motor can be made compact and the number of components can be reduced.

What is claimed is:

1. A magnetic bearing for a rotatable body provided about a stationary shaft fixed to a base, the magnetic bearing supporting a load applied axially by the rotatable body, comprising:

an annular levitational permanent magnet having an axial thickness, an inner peripheral surface and an outer peripheral surface, and disposed at an axial end portion of said rotatable body; and a magnetic substance having an axial thickness, an inner peripheral surface, and being non-saturable by magnetic flux density passing through the inner peripheral surface thereof, the magnetic substance being disposed on the base so that the inner peripheral surface thereof faces the outer peripheral surface of said levitational permanent magnet with a predetermined gap therebetween, wherein each of the inner peripheral surface and the outer peripheral surface of said levitational permanent magnet is polarized to a single pole of opposite polarity, respectively, thereby to develop maximum flux density midway of the axial thickness thereof, and the axial thickness of said magnetic substance is less than the axial thickness of said levitational permanent magnet so that said levitational permanent magnet is attracted into alignment with the axial thickness of said magnetic substance;

and wherein said rotatable body has a rotational permanent magnet fixed to said rotatable body outwardly from said annular levitational magnet, and said magnetic substance forms a magnetic circuit with said rotational permanent magnet.

2. A magnetic bearing according to claim 1, wherein the base has a circuit board mounted thereon, and said magnetic substance is disposed between the base and the circuit board.

3. A magnetic bearing for a rotatable body provided about a stationary shaft fixed to a base, the magnetic bearing supporting a load applied axially by the rotatable body, comprising:

an annular levitational permanent magnet having an axial thickness, inner and outer peripheral surfaces, and upper and lower end surfaces, the levitational permanent magnet being disposed at an axial end portion of said rotatable body; and a magnetic substance having an axial thickness, an inner peripheral surface, and being non-saturable by magnetic flux density passing through the inner peripheral surface thereof, the magnetic substance being disposed on the base so that the inner peripheral surface thereof faces the outer peripheral surface of said levitational permanent magnet with a predetermined gap therebetween, wherein each of the upper end surface and the lower end surface of said levitational permanent magnet is polarized to a single pole, of opposite polarity, respectively, thereby to develop maximum flux density at the upper and lower end surfaces thereof, and the axial thickness of said magnetic substance is slightly larger than the axial thickness of said levitational permanent magnet so that said levitational permanent magnet is attracted into alignment with the axial thickness of said magnetic substance, and wherein said rotatable body has a rotational permanent magnet fixed to said rotatable body outwardly from said annular levitational magnet, and said magnetic substance forms a magnetic circuit with said rotational permanent magnet.

4. A magnetic bearing according to claim 3, wherein the base has a circuit board mounted thereon, and said magnetic substance is disposed between the base and the circuit board.

5. A magnetic bearing for a drive motor including:

a stationary shaft fixed to a base and having an outer peripheral portion;

a rotatable body having an outer peripheral portion and provided about the outer peripheral portion of said stationary shaft with a predetermined gap therebetween;

a rotational permanent magnet fixed to the outer peripheral portion of said rotatable body;

a circuit board provided on the base; and a drive coil disposed on the circuit board and for generating torque between said drive coil and said rotational permanent magnet; said magnetic bearing comprising:

an annular levitational permanent magnet having an axial thickness and disposed at an axial end portion of said rotatable body; and a magnetic substance having an inner peripheral surface and being non-saturable by magnetic flux density passing through the inner peripheral surface thereof and disposed so that the inner peripheral surface thereof faces an outer peripheral portion of said levitational permanent magnet with a predetermined gap therebetween, the magnetic substance forming a magnetic circuit with said rotational permanent magnet;

wherein each of an inner peripheral surface and an outer peripheral surface of said levitational permanent magnet is polarized to a single pole of opposite polarity, respectively, thereby to develop maximum flux density midway of the axial thickness thereof, said magnetic substance has an axial thickness less than an axial thickness of said levitational permanent magnet so that said levitational permanent magnet is attracted into alignment with the axial thickness of said magnetic substance, and said magnetic substance is disposed between the base and the circuit board.

6. A magnetic bearing for a drive motor including:

a stationary shaft fixed to a base and having an outer peripheral portion;

a rotatable body having an outer peripheral portion and provided about the outer peripheral portion of said stationary shaft with a predetermined gap therebetween;

a rotational permanent magnet fixed to the outer peripheral portion of said rotatable body;

a circuit board provided on the base; and a drive coil disposed on the circuit board and for generating torque between said drive coil and said rotational permanent magnet; said magnetic bearing comprising:

an annular levitational permanent magnet disposed at an axial end portion of said rotatable body, said annular levitational permanent magnet having upper and lower end surfaces; and a magnetic substance having an inner peripheral surface and being non-saturable by magnetic flux density passing through the inner peripheral surface thereof and disposed so that the inner peripheral surface thereof faces an outer peripheral portion of said levitational permanent magnet with a predetermined gap therebetween, the magnetic substance forming a magnetic circuit with said rotational permanent magnet;

wherein each of the upper and lower end surfaces of said levitational permanent magnet is polarized to a single pole of opposite polarity, respectively, thereby to develop maximum flux density at the upper and lower end surfaces thereof, said magnetic substance has an axial thickness greater than an axial thickness of said levitational permanent magnet so that said levitational permanent magnet is attracted into alignment with the axial thickness of said magnetic substance, and said magnetic substance is disposed between the base and the circuit board.

* * * * *